United States Patent [19]

Shirai

[11] Patent Number: 4,698,700
[45] Date of Patent: Oct. 6, 1987

[54] AIR GUIDE FOR TAPE COPYING APPARATUS

[75] Inventor: Toshio Shirai, Kanagawa, Japan

[73] Assignee: Sony Corporation, Tokyo, Japan

[21] Appl. No.: 867,951

[22] Filed: May 29, 1986

[51] Int. Cl.⁴ .......................... G11B 5/86; G11B 5/008
[52] U.S. Cl. .......................................... 360/16; 360/17
[58] Field of Search ............................. 360/15, 16, 17

[56] References Cited

U.S. PATENT DOCUMENTS

| | | | |
|---|---|---|---|
| 3,161,120 | 12/1964 | Timares et al. | 360/16 |
| 3,472,971 | 10/1969 | Van Den Berg | 360/17 |
| 3,544,732 | 12/1970 | Bauer | 360/17 |
| 3,813,688 | 3/1971 | Dolby et al. | 360/17 |
| 4,363,038 | 12/1982 | Fayling | 360/17 |

Primary Examiner—Raymond F. Cardillo
Assistant Examiner—Surinder Sachar
Attorney, Agent, or Firm—Lewis H. Eslinger; Alvin Sinderbrand

[57] ABSTRACT

In a tape signal copying apparatus in which signals recorded on a running mother tape are copied onto a running copy tape by urging the two running tapes against a tape guide member by air blown from an air blow-off slit and by applying a magnetic field or heat to the tapes, an air pool groove is formed in a wall of an air guide member at such a position as to face the tape guide member to further increase air pressure against the running tapes within an area where signals have already been copied. The higher air pressure elminates an offset in the mutual positional relationship between two tapes due to tape extension fluctuations, and therefore prevents a harmful influence such as demagnetization or thermal disturbance of other signals recorded on the mother tape upon signals already recorded on the copy tape, so that high level signals can be reliably copied between the two tapes.

9 Claims, 7 Drawing Figures

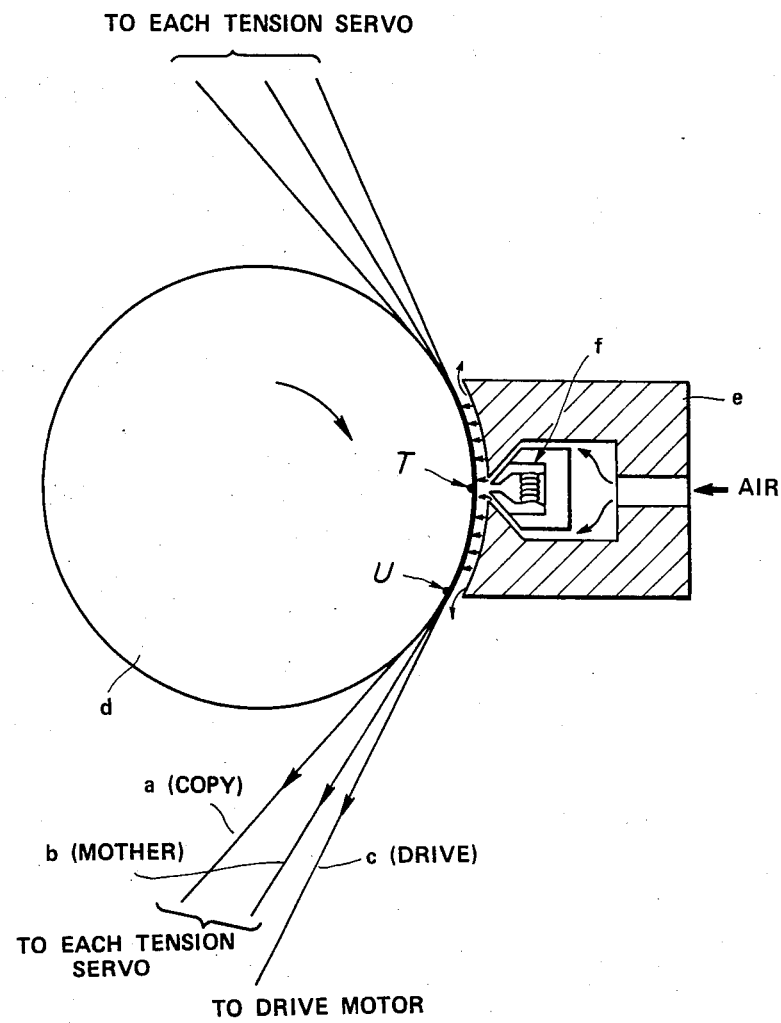
FIG. 1 *(Prior Art)*

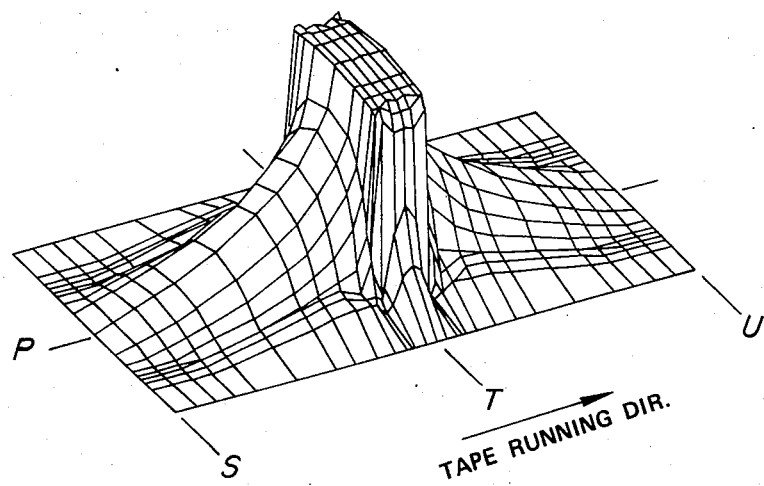
FIG.5 (A) (Prior Art)
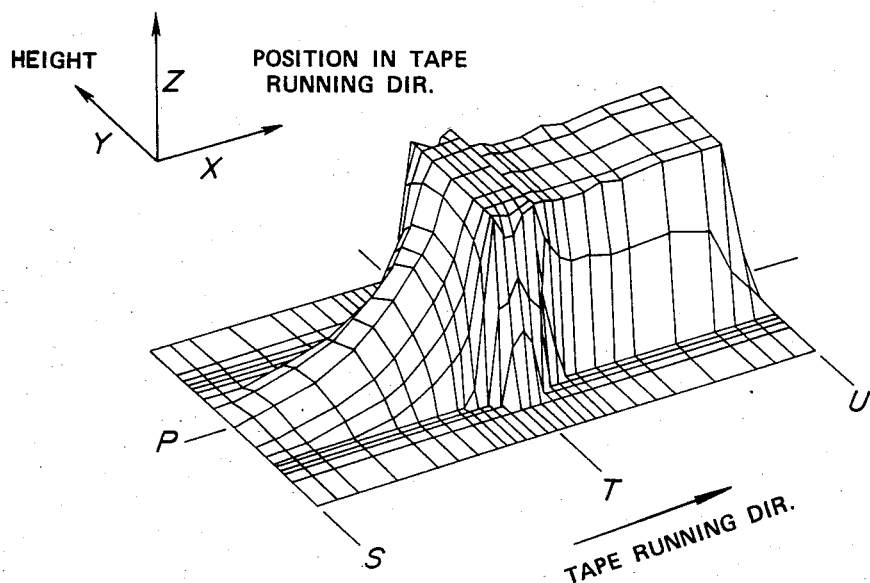
FIG.5 (B)

AIR GUIDE FOR TAPE COPYING APPARATUS

BACKGROUND OF THE INVENTION

1. Field of the Invention

The present invention relates to a tape signal copying apparatus, and more specifically to a novel tape signal copying apparatus such that signals recorded on a mother tape are copied to a copy tape by urging these tapes running along a tape guide member against the tape guide member by means of air blown off through an air blow-off outlet formed in an air guide member.

2. Description of the Prior Art

Tape signal copying apparatus by which various signals such as video, audio, information, etc. magnetically recorded on a mother tape can be copied onto a copy tape have been well known. An example of these apparatus is disclosed in Japanese Unexamined Published Patent Application No. 58-137137. The tape signal copying apparatus of this type comprises at least a copy drum for guiding the mother tape and the copy tape and an air guide member formed with an air blow-off outlet formed in a wall surface facing the outer periphery of the copy drum. These mother and copy tapes are passed at a high speed between the copy drum and the air guide member with two tapes arranged one upon the other, and urged against the copy drum by air blown off from an air blow-off outlet formed in the air guide in order to copy tape information signals magnetically recorded on the mother tape onto the copy tape. Further, in general, a bias magnetic head for generating a bias magnetic field within a copying area is housed within the air guide member for enabling the above-mentioned tape signal copying operation.

In the prior art tape signal copying apparatus as described above, however, there exists a problem in that the mutual positional relationship between the mother tape and the copy tape tends to slipped or to produce an offset due to tape tension fluctuations and therefore signals recorded on the mother tape are copied overlapping upon signals already copied on the copy tape after the normal copying operation; that is, the mother tape exerts a harmful influence upon the copy tape on which signals have already been copied, so that the magnitude of magnetization of the copied signals is reduced; as a result, the copied signal level is lowered; in other words, the fidelity of the copied signal in the copying operation is deteriorated.

The arrangement of the prior art magnetic tape signal copying apparatus will be described in further detail with reference to the attached drawing under DETAILED DESCRIPTION OF THE PREFERRED EMBODIMENTS.

Further, the same problem as described above arises in thermal tape signal copying apparatus. That is, in case an offset of the mutual positional relationship between the mother tape and the copy tape occurs due to tape tension fluctuations, signals recorded on the mother tape exert a harmful influence upon the copy tape on which signals have already been copied, so that the thermal conditions of the copied signals are disturbed.

SUMMARY OF THE INVENTION

With these problems in mind, therefore, it is the primary object of the present invention to provide a novel tape signal copying apparatus which can prevent an offset in the mutual positional relationship between the mother tape and the copy tape due to fluctuations of tape tension, that is, to prevent the copied signal level from being lowered due to demagnetization or thermal disturbance caused by the above positional offset between the two tapes.

To achieve the above-mentioned object, the tape signal copying apparatus according to the present invention comprises: (a) a tape guide member for guiding at least a mother tape and a copy tape along a tape guide surface thereof; and (b) an air guide member having a wall facing the tape guide surface of the tape guide member and formed with an air blow-off slit for blowing off air against the mother and copy tapes to urge the tapes against the tape guide surface of the tape guide member during copying operation and with an air pool groove communicating with the air blow-off slit and formed in the wall of the air guide member.

The air pool groove extends beginning from the air blow-off slit, in a direction that the two tapes travel, to near a position that the two tapes are separated from each other. Further, the width of the air pool groove is determined to be narrower than that of the tapes.

In the copying apparatus according to the present invention, since an air pool groove is formed extending from the air blow-off slit in the tape running direction, it is possible to further urge the tapes against the tape guide member over a relatively wider range, and therefore it is possible to prevent an offset in the mutual positional relationship between the mother tape and the copy tape from being produced due to fluctuations of tape tensions. Therefore, it is possible to effectively eliminate the harmful influence such as demagnetization or thermal disturbance of other signals recorded on the mother tape upon signals already recorded on the copy tape. This advantage permits a higher level and higher reliability for copied signals.

BRIEF DESCRIPTION OF THE DRAWINGS

The features and advantages of the tape signal copying apparatus according to the present invention over the prior art apparatus will be more clearly appreciated from the following description taken in conjunction with the accompanying drawings in which like reference numerals designate corresponding elements and in which:

FIG. 1 is a diagrammatic cross-sectional view showing an example of prior art magnetic tape signal copying apparatuses in which a drive tape is further incorporated to reduce fluctuations of tape tensions;

FIG. 5(A) is a three-dimensional diagram showing the prior-art air pressure distribution with respect to the tape height and the tape running position within an area where the tape is in pressure contact with the tape guide member; and FIG. 5(B) is a similar three-dimensional diagram showing the air pressure distribution according to the present invention in which an air pool groove is formed in the air guide member.

DETAILED DESCRIPTION OF THE PREFERRED EMBODIMENT

Figure 2A:
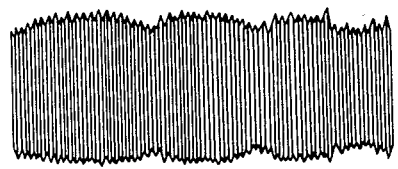
FIG. 2(A) is a prior art waveform diagram of a copied signal obtained when there exists a demagnetization due to an offset of the mutual positional relationship between the mother tape and the copy tape.

To facilitate understanding of the present invention, a brief reference will be made to a prior-art magnetic tape signal copying apparatus with reference to the attached drawings, by way of example.

FIG. 1 shows an example of the prior art apparatus. In the drawing, a copy tape a and a mother tape b are arranged one upon another and driven by a drive tape c rolled up by a drive motor (not shown). Both the copy tape a and the mother tape b are driven by a tape guide drum d (or a copy drum) rotated at such a speed that the circumferential speed of the tape guide drum may be equal to the running speed of the drive tape c. Further, in order to reduce the fluctuations of tape tension, plural tape tension servo mechanisms are provided on the supply side of the drive tape c and on both the supplied and take-up sides of the copy tape a and the mother tape b. Further, in FIG. 1, the reference symbol e denotes an air guide member; vf denotes a bias magnetic head housed within the air guide member e.

In the copying apparatus as shown in FIG. 1, it is necessary to increase the tape running speed in order to increase the copying effeciency. In practice, the tape running speed is as high as several meters per second or so. Therefore, even if the running speed of the copy and mother tapes are controlled at a constant speed by means of the tape speed control servo mechanisms, it is very difficult to control the tape running speed at a sufficiently accurate speed, thus causing a positional offset between the copy and mother tapes. The above reason can be considered as follows: the electronic elements such as a speed sensor constituting the servomechanism and the mechanism parts such as a take-up motor inevitably involve a time delay due to time constant or inertia, so that even if short, it takes a time to restore the tape speed to a predetermined speed whenever the tape speed fluctuates. In the case where the tape running speed is relatively low, this short time delay may not cause a large offset in the mutual positional relation between the two tapes. However, where the tape running speed is high, the influence of the short time delay readily results in a tape positional offset to such an extent as not to be negligible.

When the above-mentioned tape positional offset occurs in an area extending from a central transfer point T at which the two tapes a and b are in pressure contact with the tape guide drum d to a tape uncontact point U at which the two tapes a and b are separated from the tape guide drum d, there exists a problem such that signals recorded on the mother tape b is further copied upon other signals already copied on the copy tape a. In other words, signals already copied on the copy tape a undergo a harmful magnetic influence of other signals already recorded on the mother tape b. Therefore, in practice, the magnetic signal copied on the copy tape a is demagnetized. Further, the above-mentioned harmful magnetic influence of the mother tape b upon the copy tape a occurs even in an area to which no bias magnetic field is applied. The demagnetization of the copied signals inevitably lowers the output level of the signals recorded on the copy tape. Some experiments indicate that there exists a case where the signal output level is lowered as much as 2dB.

Figure 2B:
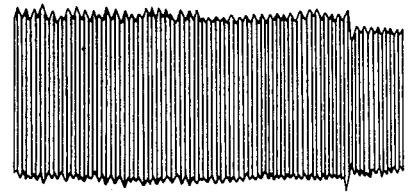
FIG. 2(B) is a similar waveform diagram of a copied signal obtained where there exists no demagnetization due to an offset of the mutual positional relationship between the two tapes.

In this connection, FIG. 2(A) shows an example of a waveform representative of radio frequency signals obtained when the signals recorded by a video tape recorder are copied under the influence of the above-mentioned demagnetization; while FIG. 2(B) shows the similar waveform obtained when copied without being subjected to the influence of the demagnetization. These two figures indicate that the difference in the waveform of the radio frequency signals between the two is not negligible and therefore should be improved.

In view of the above description, reference is now made to an embodiment of the tape signal copying apparatus according to the present invention.

The apparatus mainly comprises a tape guide member or a copy drum, an air guide member and an air pool groove. Therefore, the description will be made hereinbelow according to these essential members.

(a) Tape guide member or Copy drum

Figure 3:
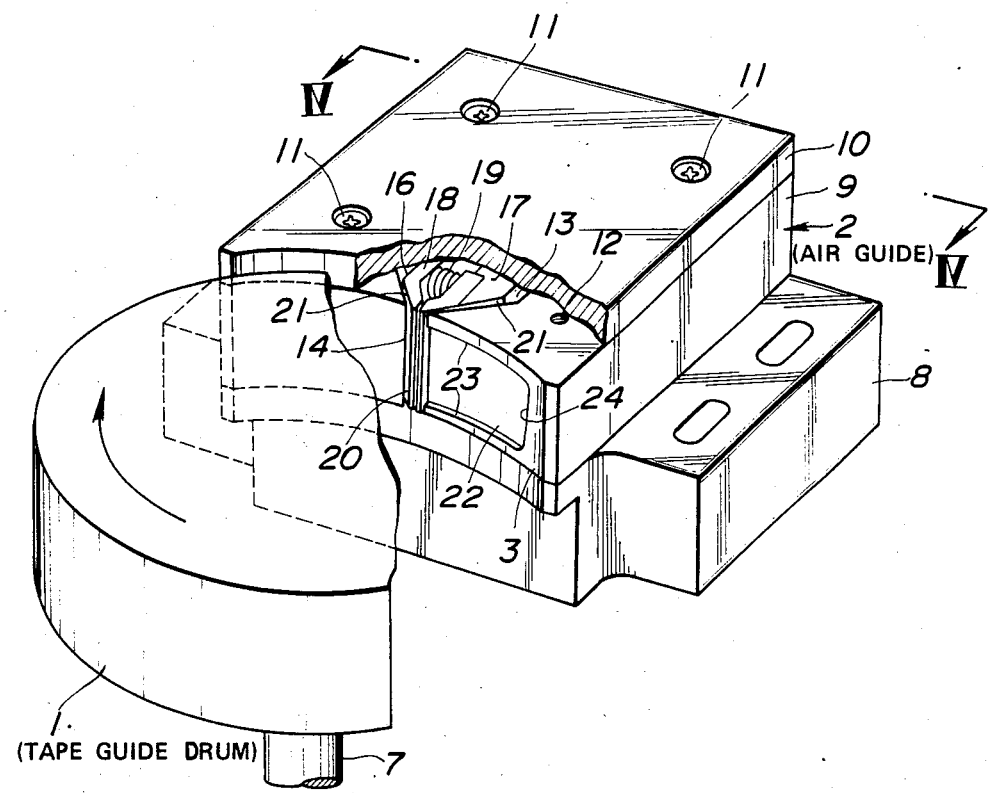
FIG. 3 is a perspective, partially broken away, view showing an embodiment of the tape signal copying apparatus according to the present invention.
Figure 4:
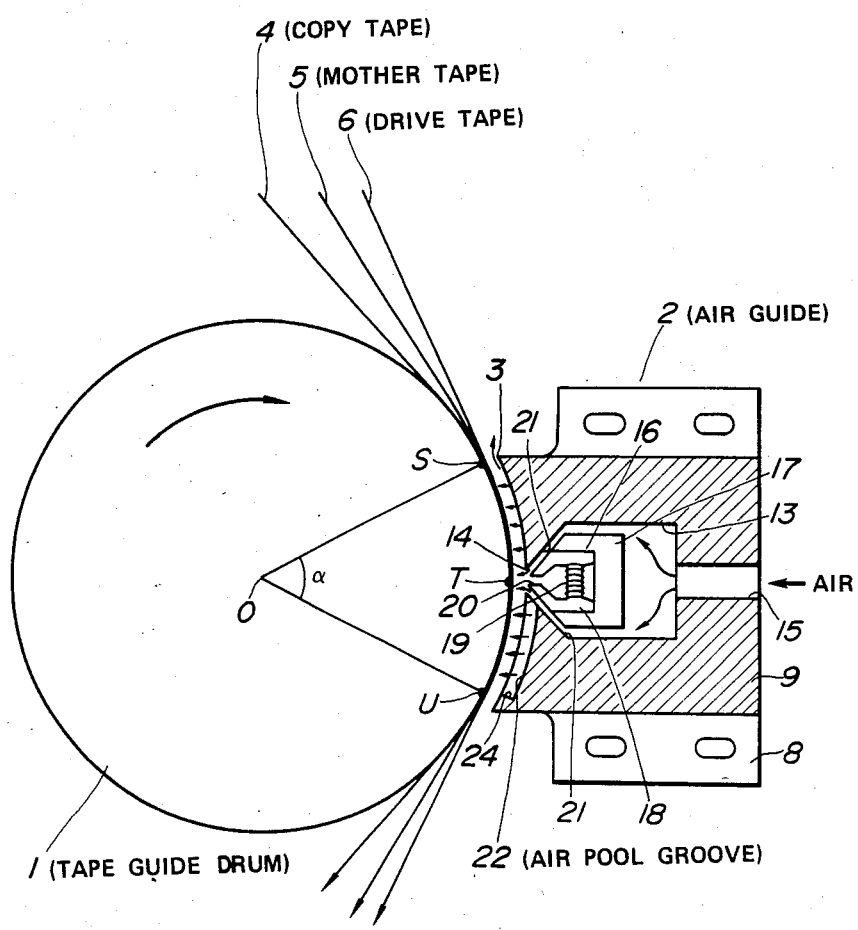
FIG. 4 is a cross-sectional view taken along the line IV—IV shown in FIG. 3.

In FIGS. 3 and 4, the reference numeral 1 denotes a tape guide member; 2 denotes an air guide member formed with a wall surface 3 facing part of the outer peripheral surface of the tape guide member 1. Between the wall surface 3 of the air guide member 2 and the outer peripheral surface of the tape guide member 1, a copy tape 4, a mother tape 5 and a drive tape 6 are passed being arranged one upon another. In more detail, the positional relationship among these three tapes is such that the copy tape 4 is positioned on the side of the tape guide member 1; the drive tape 6 is positioned on the side of the air guide member 2; and the mother tape 5 is sandwiched between the copy and drive tapes 4 and 6. Each of these three tapes is supported under a tension between a supply reel (not shown) and a take-up reel (not shown) so as to be brought into pressure contact with part of the outer periphery of the tape guide member 1 within an area extending from a tape contact start point S to a tape uncontact point (tape separation point) U. Therefore, within the area of angle α subtended by two lines OS and OU (where 0 is a rotative center of the tape guide member 1). the surfaces of the copy and mother tapes 4 and 5 are in pressure contact with each other. Further, the drive tape 6 is driven at a predetermined constant speed by a take-up reel rotated by a drive motor (not shown). On the other hand, the tape guide member (the copy drum) 1 is rotated by a motor (not shown) connected to a shaft 7 (shown in FIG. 3) at such a speed that the outer peripheral speed of the drum is equal to the tape running speed. Therefore, the copy tape 4 and the mother tape 5 are driven at a constant speed by the aid of the rotating tape guide member 1 and the running drive tape 6. In addition to the above-mentioned tape driving mechanism, an appropriate tape tension control servo mechanism is further provided for each of the copy tape 4 and the mother tape 5 on both the let-off motion side and the take-up motion side so as to keep the tension of each tape 4 or 5 at a predetermined constant value. Further, on the let-off side of the drive tape 6, a tape tension control servo mechanism is provided to control the tension thereof. The above tension control servo mechanisms serve to minimize the fluctuations of tension applied to each of the copy tape 4 and the mother tape 5. However, as already described, since there inevitably exist a time constant or an inertia in tension sensors or motors constituting the tension servo mechanisms, it is impossible to perfectly eliminate the fluctuations of tape tension.

Further, T denotes a central transfer point in a copying area starting from a contact start point S to an uncontact point U, at which copying is performed from the mother tape 5 to the copy tape 4. This point T is referred to as a transfer point or line.

(b) Air guide member

The air guide member comprises a base 8, a guide block 9 fixed on the base 8, and a cover 10 (shown in FIG. 3) fixed on the guide block 9 with set screws 11. for instance. Further, in FIG. 3, the numeral 12 denotes a threaded hole formed in the guide block 9 into which a set screw 11 is screwed.

The guide block 9 is formed with a circular arc portion, when seen from above, on one side thereof facing the tape guide member 1. The radius of the curvature of the circular arc portion is determined to be a little larger than the radius of the tape guide member 1. The side surface of this circular arc portion corresponds to the wall surface 3 of the air guide member 2 which faces part of the outer peripheral surface of the tape guide member 1. The area where the wall surface 3 faces the tape guide member 1 extends from the contact start point S on the outer peripheral surface of the tape guide member 1, through the transfer point T, to a point a little beyond the uncontact point U.

The reference numeral 13 denotes an air chamber formed by boring the guide block 9. The air chamber 13 is of irregular pentagonal shape made up of a triangular shape and a square shape. The apex of this triangular shape opens at the middle of the wall surface 3 so as to form an elongate air blow-off slit 14 in the vertical direction or the shaft direction of the tape guide member 1. This air blow-off slit 14 directly faces the transfer point T.

The air chamber 13 is enclosed by the cover 10 on the upper side and by the base 8 on the bottom side so as to form a space through which air to be blown off against the tapes can flow freely. The reference numeral 15 denotes an air inlet orifice extending from the outside, through the side wall of the guide block 9 remote from the wall surface 3, to the air chamber 13, to which an air supply pipe (not shown) is connected to supply air to be blown off.

The reference numeral 16 denotes a bias magnetic head housed within the air chamber 13 and supported by a head holder 17. The magnetic head 16 includes a core 18 and an exciting coil 19. A gap 20 formed in the core 18 is located roughly at the middle of the air blow-off slit 14 to generate a bias magnetic field of a predetermined magnitude at the transfer point T.

As described above, the copy tape 4 and the mother tape 5 both driven in contact with each other are further urged so as to be brought into pressure contact with each other against the tape guide member 1 by air blown off from the air blow-off slit 14, and additionally excited by the bias magnetic field generated by the magnetic head 16. Therefore, signals recorded on the mother tape 5 can be copied onto the copy tape at the transfer point T.

Further, two air guide spaces 21 formed between the bias magnetic head 16 and the inner wall of the air chamber 13 and between the head holder 17 and the inner wall of the air chamber 13 serve to further increase the flow speed of the air introduced through the air inlet orifice 15.

(c) Air pool groove

The reference numeral 22 denotes an air pool groove formed in the wall surface 3 of the air guide member 2.

This air pool groove 22 can be formed by cutting off thin the surface of the wall 3 beginning from the air flow-off slit 14 in the tape running direction. This air pool groove 22 communicates with the air blow-off slit 14 and extends from the air blow-off slit 14 to near the tape uncontact point U. The width of this groove 22 is a little narrower than that of the tapes 4, 5 and 6; that is, the upper and lower inner side surfaces 23, 23 of the air pool groove 22 are located inside of both the edges of the running tapes 4, 5 and 6. Further, the depth of the groove 22 is about 0.2 to 0.3 mm, for instance.

Therefore, the air flowing through the two air guide spaces 21, 21 and blown off from the air blow-off slit 14 is mainly pooled within the air pool groove 22, because the major part of the air flowing in the tape running direction is blocked by the upper and lower inner side surfaces 23, 23 formed in the air pool groove 22 and by the end surface 24 also formed in the air pool groove 22. Therefore, the air flowing along the bottom surface of the air pool groove 22 becomes high in pressure, so that the running tapes 4, 5 and 6 are further urged strongly against the outer peripheral surface of the tape guide member 1. In other words, the three running tapes 4, 5 and 6 are brought into high pressure contact with each other in the area extending from the transfer point T to the tape uncontact point U, in particular, by the air directly blown off from the air blow-off slit 14 at the transfer point T and by the high air pressure developed within the air pool groove 22. Therefore, in case there exist small fluctuations of tape tension in the copy tape 4 or the mother tape 5, it is possible to prevent an offset in the mutual positional relationship between the copy tape 4 and the mother tape 5 from being produced within the area from the transfer point T to the tape uncontact point U.

In this connection, FIGS. 5(A) and 5(B) depict the pressure distribution of the air blown off through the air blow-off slit 14 on the outer peripheral surface of the tape guide member 1. FIG. 5(A) depicts the pressure distribution obtained when no air pool groove is formed in the wall 3 of the air guide member 2, while FIG. 5(B) depicts that obtained when the air pool groove 22 is formed therein. In these drawings, the axis X indicates the tape running direction within the area where the tapes 4, 5 and 6 are in pressure contact with the outer periphery of the tape guide member 1 and the symbols S, T and U correspond to the tape contact start point, the transfer point, and the tape uncontact point, all shown in FIG. 4. The axis Y indicates the height of the tape in the vertical direction and the symbol P corresponds to a middle position of the air blow-off slit 14 in the vertical direction thereof. The axis Z indicates the air pressure.

These two drawings indicate that in the case of the absence of the air pool groove, as shown in FIG. 5(A), although the air pressure is fairly high near the transfer point T corresponding to the opening position of the air blow-off slit 14, the pressure decreases sharply as the measurement point goes away from the point T in the tape running direction (or in the direction opposite to the tape running). Therefore, it is impossible to prevent an offset in the mutual positional relationship between the two tapes 4 and 5 due to the fluctuations of each tape tension from being produced at the positions where signals have already been copied.

In contrast with this, in the case of the presence of the air pool groove 22, as shown in FIG. 5(B), the air pressure is fairly high in a wide area extending from the transfer point T to the uncontact point U, so that a high air pressure is applied to the tapes 4, 5 and 6. In this case, the air pressure is maximum (e.g. 4 kg/cm$^2$) at the transfer point T and is lowered on both the sides of the transfer point T. However, since the air pool groove 22 is formed, the air pressure developed in the air pool groove 22 is not so reduced (e.g. 2 to 10%) or fairly high (e.g. 90 to 98% of the maximum value). In other words, it is possible to apply a high air pressure almost equal to the maximum pressure obtained at the transfer point T to the area between the transfer point T and the uncontact point U of the tapes 4, 5 and 6 within which signals have already been copied. Therefore, it is possible to effectively prevent an offset in the mutual positional relationship between the two tapes 4 and 5 due to fluctuations in tension of the copy tape 4 or the mother tape 5 from being produced at the area where tape signals have already been copied. According to the experiments of this embodiment, it is possible to set the whole urging force of air against the tapes 4, 5 up to 6 to 12 kg or so. Therefore, it has been possible to perfectly eliminate the offset in the mutual positional relationship between the two tapes 4 and 5 due to tape tension fluctuations. This is because the mutual positional relationship between the two tapes can be retained in dependence upon a high air pressure applied to the tapes over a relatively wide area without being subjected to the influence of fluctuations of tape tensions.

In this embodiment, therefore, it is possible to overcome the afore-mentioned problem such that the tape signals already and correctly copied on a copy tape 4 as shown in FIG. 2(A) are deformed due to demagnetization by the overlap of signals of the mother tape with those of the mother tape, which is caused by an offset in the mutual positional relationship between the copy tape and the mother tape, as shown in FIG. 2(B).

Further, it is also possible to form the air pool groove 22 extending from the contact start point S to the uncontact start point U in FIG. 4. It can be considered that the necessity of forming the air pool groove in the direction opposite to the tape running is not so important, because an offset in the mutual positional relationship between the copy tape and the mother tape does not exert a harmful influence such as demagnetization upon the copy tape within the area where tape signals have not yet been copied. In this case, however, there still exists an advantage such that the whole tape urging force against the tape guide member 1 can further be increased and therefore it is possible to more securely prevent the above-mentioned positional offset.

The above description has been made of the embodiment in which the present invention is applied to a tape signal copying apparatus including a drive tape for driving the copy tape 4 and the mother tape 5 together. However, the present invention is of course applicable to the apparatus including no drive tape, for instance, as disclosed in the afore-mentioned Japanese Unexamined Published Patent Application No. 58-137137.

Furthermore, the present invention has been described of the tape signal copying apparatus of magnetic type by way of example. However, without being limited to the copying apparatus of magnetic type, the present invention can be applied to other types such as thermal copying apparatus. In the thermal copying apparatus, when an offset in the mutual positional relationship between the copy tape and the mother tape is produced due to tape tension fluctuations in an area where tape signals have already been copied, other signals recorded on the mother tape are further copied overlapping with the signals already recorded on the copy tape or exert a harmful influence such as thermal disturbance upon signals already recorded on the copy tape, so that there exists the similar problem in that the output level of the thermally recorded signal is lowered. Therefore, where the air pool groove is formed in the thermal copying apparatus, it is possible to effectively eliminate a positional offset in the mutual relationship between the two tapes due to tape tension fluctuations and therfore to prevent the thermal disturbance of the mother tape upon the copy tape for providing a higher output level and higher reliable copied signal.

As described above, in the tape signal copying apparatus according to the present invention, since the air pool groove is formed in the wall of the air guide member at such a position as to face the tape running surface of the tape guide member beginning from the air blow off slit in the tape running direction, it is possible to urge the running tapes against the tape guide member over a relatively wide range beginning from the air blow-off slit to a position Where the tapes are separated from each other. The above high pressure application in a wider area prevents an offset in the mutual positional relationship between the two tapes due to fluctuations of tape tensions. Therefore, it is possible to effectively eliminate a harmful influence such as demagnetization or thermal disturbance of other signals recorded on the mother tape upon the signals already recorded on the copy tape, so that the output level of the copied signal is improved and therefore the copying reliability of signals can be enhanced.

What is claimed is:

1. In a tape signal copying apparatus having:
   (a) a tape guide member for guiding at least a mother tape and a copy tape along a tape guide surface thereof; and
   (b) an air guide member having a wall facing the tape guide surface of said tape guide member and formed with an air blow-off slit for blowing air against an outer one of said mother and copy tapes against the tape guide surface of said tape guide member at a copying location during a copying operation, the improvement comprising an air pool groove communicating with the air blow-off slit and formed in said wall of said air guide member facing said tape guide surface, and wherein said air pool groove begins at the air blow-off slit and extends therefrom in a direction of travel of said mother tape and copy tape to an end surface formed in said wall of said air guide member, whereby air from said blow-off slit in said air pool groove urges said mother tape and copy tape against said tape guide member in an area where signals have been copied.

2. The tape signal copying apparatus as set forth in claim 1, wherein the air pool groove extends from said slit to a position on said air guide member corresponding to a point on said tape guide member where the mother and copy tapes are separated from each other, whereat said end surface is located.

3. The tape signal copying apparatus as set forth in claim 1, wherein a width of the air pool groove is narrower than that of the tapes.

4. The tape signal copying apparatus as set forth in claim 1, wherein a depth of the air pool groove is about 0.2 to 0.3 mm.

5. The tape signal copying apparatus as set forth in claim 1, wherein an air pressure in the air pool groove is about 90 to 98% of that at the air blow-off slit.

6. In a tape signal copying apparatus having a tape guide member for guiding travel of at least a mother tape and a copy tape in mutual cntact along a tape guide surface thereof and an air guide member with an outer wall facing the tape guide surface of the tape guide member and formed with an air blow-off slit for blowing air therethrough and against the outer one of the mother and copy tapes to urge the tapes in close contact against the tape guide surface of the tape guide member at a copying location during a copying operation, the improvement comprising an air pool groove communicating at one side with said air blow-off slit and being formed in said outer wall of said air guide member so as to extend in a direction of tape travel to an end surface formed in said outer wall of said air guide member and located at a point corresponding to a point on said tape guide member where the mother tape and copy tape are separated from each other, whereby air in said air pool groove urges the mother tape and copy tape in close contact against the tape guide surface in an area where signals have been copied.

7. The tape signal copying apparatus as set forth in claim 6, wherein said air pool groove has a width that extends over substantially all of the width of the mother tape and copy tape when in mutual contact.

8. The tape signal copying apparatus as set forth in claim 6, wherein a depth of said air pool groove is between 0.2 to 0.3 mm.

9. The tape signal copying apparatus as set forth in claim 6, wherein an air pressure in said air pool groove is between 90 to 98% of an air pressure at the air blow-off slit.

* * * * *